Aug. 14, 1945.   W. G. HOELSCHER   2,382,719
DRILL SPINDLE DRIVING MECHANISM
Original Filed July 28, 1939    3 Sheets-Sheet 1

INVENTOR.
William G. Hoelscher
BY Wood, Arey, Herron & Evans
Attorneys

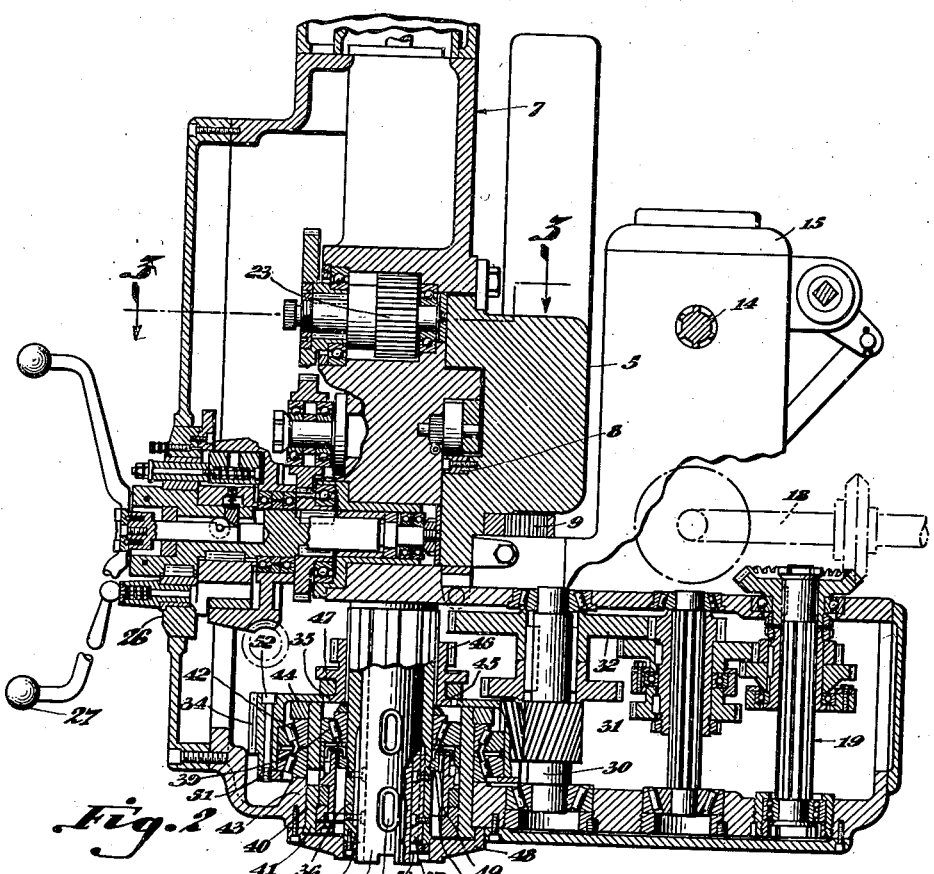

Aug. 14, 1945.   W. G. HOELSCHER   2,382,719
DRILL SPINDLE DRIVING MECHANISM
Original Filed July 28, 1939   3 Sheets-Sheet 3

INVENTOR.
William G. Hoelscher
BY Wood, Arey, Herron & Evans
Attorneys.

Patented Aug. 14, 1945

2,382,719

UNITED STATES PATENT OFFICE 2,382,719

DRILL SPINDLE DRIVING MECHANISM

William G. Hoelscher, Cincinnati, Ohio, assignor to The American Tool Works Company, Cincinnati, Ohio, a corporation of Ohio Original application July 28, 1939, Serial No. 287,132. Divided and this application May 28, 1943, Serial No. 488,857

5 Claims. (Cl. 74—333)

This invention relates to machine tools and it is directed particularly to an improved means for journalling a tool operating spindle. The invention is disclosed in the environment of a spindle for a radial drill but it is to be understood that this is only one embodiment and the invention contemplates various other uses in which the spindle is rotated from a gear or pinion in a transmission train.

A tool spindle is subjected to driving loads which increase substantially in proportion to the size of the tool or its rate of feed. If a large hole is to be drilled for example the spindle must sustain a heavy rotatable driving force, but due to the relative location of the parts, this sometimes also is accompanied by a lateral thrust which, after a period of time, causes the spindle to become misaligned or its bearings badly worn.

The principal objective of the present invention has been to provide a spindle assembly which is sustained in an improved bearing arrangement whereby correct axial alignment and true running of the spindle are maintained and such distortions are avoided. This application is a division of my copending application Serial No. 287,132 entitled Drill spindle driving mechanism and, among other features, the invention contemplates a transmission connection for imparting drive to the spindle which is disposed adjacent the tool-receiving socket of the spindle, or in the case of a radial drill approximately in the plane of the lower spindle bearing.

In the improved construction a spindle driving gear is journalled independently of the spindle assembly so that those driving stresses on the teeth of this gear, which normally tend to misalign the spindle, are not conveyed to it. In more detail the drive gear is journalled concentrically with the spindle upon a heavy bearing sustained in the head or casing of the machine. This head or casing therefore receives the heavy driving stresses and particularly absorbs lateral loads. This construction, in the preferred embodiment, is utilized for spindle rotation in low-speed ranges while a direct connection between the spindle and transmission is employed in high-speed operation where the loads are relatively light.

From the foregoing disclosure of the principle of the invention and the following detailed disclosure of a typical structure as incorporated in a radial drill, those skilled in the art readily will comprehend the modifications to which the invention is susceptible.

In the drawings:

Figure 2 is a sectional elevation taken through the head illustrating the improved bearing construction in conjunction with spindle driving and feeding means. This view is taken on the line 2—2 of Figure 1.

Figure 3 is a horizontal sectional view showing the feeding arrangement and is taken on the line 3—3 of Figure 2.

Figure 1:
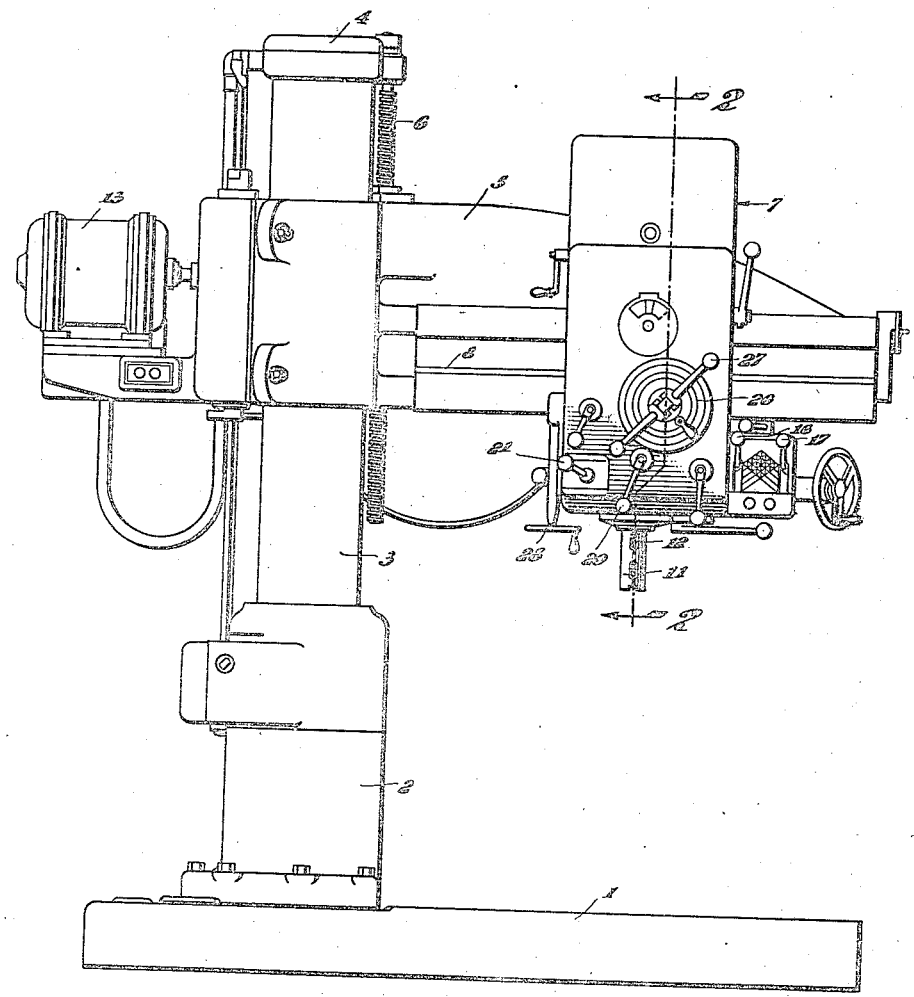
Figure 1 is a front view of a radial drill incorporating the present invention.

The general construction of the radial drill in which the present improvements are disclosed includes a base 1 which has a stump 2 rising from one end thereof. A column 3 is rotatably mounted on the stump and has a cap 4 attached to its upper end. An arm 5 is vertically slidable upon the column 3 and may be raised or lowered so as to place the arm in position for locating the drill at the proper height relative to work mounted on the base 1. The arm 5 is supported and elevated by means of a screw 6 depending from the cap 4 of the column.

A drill head 7 is slidably mounted for longitudinal movement along the arm 5 which projects radially from the column. For this purpose the arm is provided with a rail 8 along its front face. A driven pinion 9 (Figure 2) engages a rack 10 fixed along the rail face of the rail. The pinion may be rotated either by power or by hand in any suitable manner, for instance, through means disclosed and claimed in William G. Hoelscher United States Patent No. 2,295,516 of September 8, 1942, entitled Head traversing mechanism for radial drills.

Drill spindle 11 is slidably and rotatably mounted in the head 7; it has the usual socket or chuck through which a drill may be held to the spindle and may also include the usual knockout slots 12 through which the drill may be removed.

Power for the spindle is derived from an electric motor 13 which is mounted on the short end of arm 5. The power is taken through a gear box containing the arm elevating gearing and its control means to a splined shaft 14 which traverses a casing 15 at the drill head. The casing contains reversing clutches and transmission gears which, briefly, provide for different speeds which may be controlled through levers 16 and 17 for shifting alternately to high and low-speed ranges. These levers are movable with respect to dial or indicator plates and operate cams for shifting appropriate gears in the selected ranges. Power is taken through a shaft 18 to transmission gearing 19 at the lower portion of the head (Figure 2) and over to the spindle 11.

For spindle feeding purposes the head also contains a feed transmission indicated generally at 20 which is controlled through a lever 21 and which interconnects a drive gear 22, carried on the spindle, with a feed pinion 23 arranged to engage spindle rack teeth 24 and also to engage teeth on a counterweight 25. In this system the spindle is rotated through speed gearing in the transmissions 15 and 19 while the feeding motion is provided from the spindle through feeding gearing 20 to the feed pinion 23.

Feeding movement is controlled by means of a setting and indicator dial 26 and feed connection is controlled manually by means of levers 27—27 or automatically by means of a suitable dog. A handwheel 28 is provided at the head for raising and lowering the spindle manually while a lever 29 is provided for coupling the spindle either with the handwheel or the power feed.

The details of speed transmission which are indicated generally at 15 and 19 hereof and the details of the feed transmission indicated generally at 20, as well as the gear shifting devices, are fully disclosed in my copending patent application Serial No. 287,132, filed July 28, 1939 entitled Drill spindle driving mechanism; and, since these elements form no part of the present invention, they are not repeated in this application.

At the lower portion of the head the spindle 11 is journalled and driven in accordance with the present invention. A shaft 30, forming a part of the speed gearing 19, carries a slow-speed driving pinion 31 and a high-speed drive gear 32. A bull gear 33 is disposed concentrically around the spindle 11 at the lower portion of the head. This gear comprises an external gear 34 and an internal gear 35. Spindle 11 carries a driving sleeve 36 which is in splined connection therewith by means of keys 37. The driving sleeve extends upwardly along the spindle and is journalled in an upper roller bearing 38 (Figure 4) mounted in a lug in the head of the machines, and in a lower roller bearing 39 which is disposed within the bull gear 34. The casing at this portion of the machine is bored as at 40 to receive a sleeve 41 which at its interior surface supports the outer raceway of the lower spindle bearing 39. A bull wheel bearing 42 is disposed intermediate the outer surface of sleeve 41 and the interior surface of the bull wheel. This bearing preferably is a double tapered bearing supported at the bottom on a lug 43 extending upwardly from the casing, while a nut 44, threaded to sleeve 41, engages the bearing at its upper surface. From the structure just described, it may be seen that the bull wheel is mounted for free rotation through the bearings 42 on sleeve 41 which, in turn, is carried from the head of the machine. The bull wheel, therefore, may rotate independently of the spindle or the spindle sleeve 36 and the spindle, therefore, is protected from lateral driving forces.

Spindle sleeve 36 is splined at its outer surface and slidably carries a gear couplet which includes a gear 45 arranged to mesh with internal gear 35 of the bull gear and a gear 46 which, in turn, is arranged to mesh with gear 32 on the transmission shaft 30. Gears 45 and 46 are spaced apart from one another to provide an annular groove which receives a shifter yoke 47. When the gear 45 of the couplet engages internal gear 35, then power from the transmission to the spindle is imparted through a chain including pinion gear 31, external bull gear 34, internal teeth 35 thereof to the teeth of the gear 45 of the couplet, thence through the spindle sleeve 36 and finally to the spindle through keys 37. On the other hand, if the yoke 47 is shifted to move gear 46 into engagement with transmission gear 32 on shaft 30, then the power proceeds directly from transmission gear 32 to gear 46 and through the spindle sleeve 36 to the spindle. When the units are connected in this manner, the bull gear is idling.

Under heavy loads and at the slower speed provided when the drive takes place through the bull gear, its independent mounting receives the heavy lateral thrusts created through transmission of the power from the driving pinion to the bull gear and the spindle shaft is not subjected to the heavy loads that otherwise would be imposed upon it. This arrangement preserves alignment of the spindle during prolonged operation of the machine under severe usage.

In the preferred arrangement, sleeve 41 has a headed lower end which is disposed in a recess provided in a cover plate 48. Packing, indicated generally at 49, is disposed beneath the bearing 39 and the driving sleeve 36 carries a nut 50 to hold the packing in its place.

The internal portion of the bull wheel is counterbored to receive the bull wheel bearing 42 and a ring 51 is held up against the bottom of the bearing by means of bolts 52 to prevent the bull wheel from moving upwardly. Packing indicated generally at 53 also may be employed to seal the spindle driving means for preventing the leakage of oil.

Figure 4:
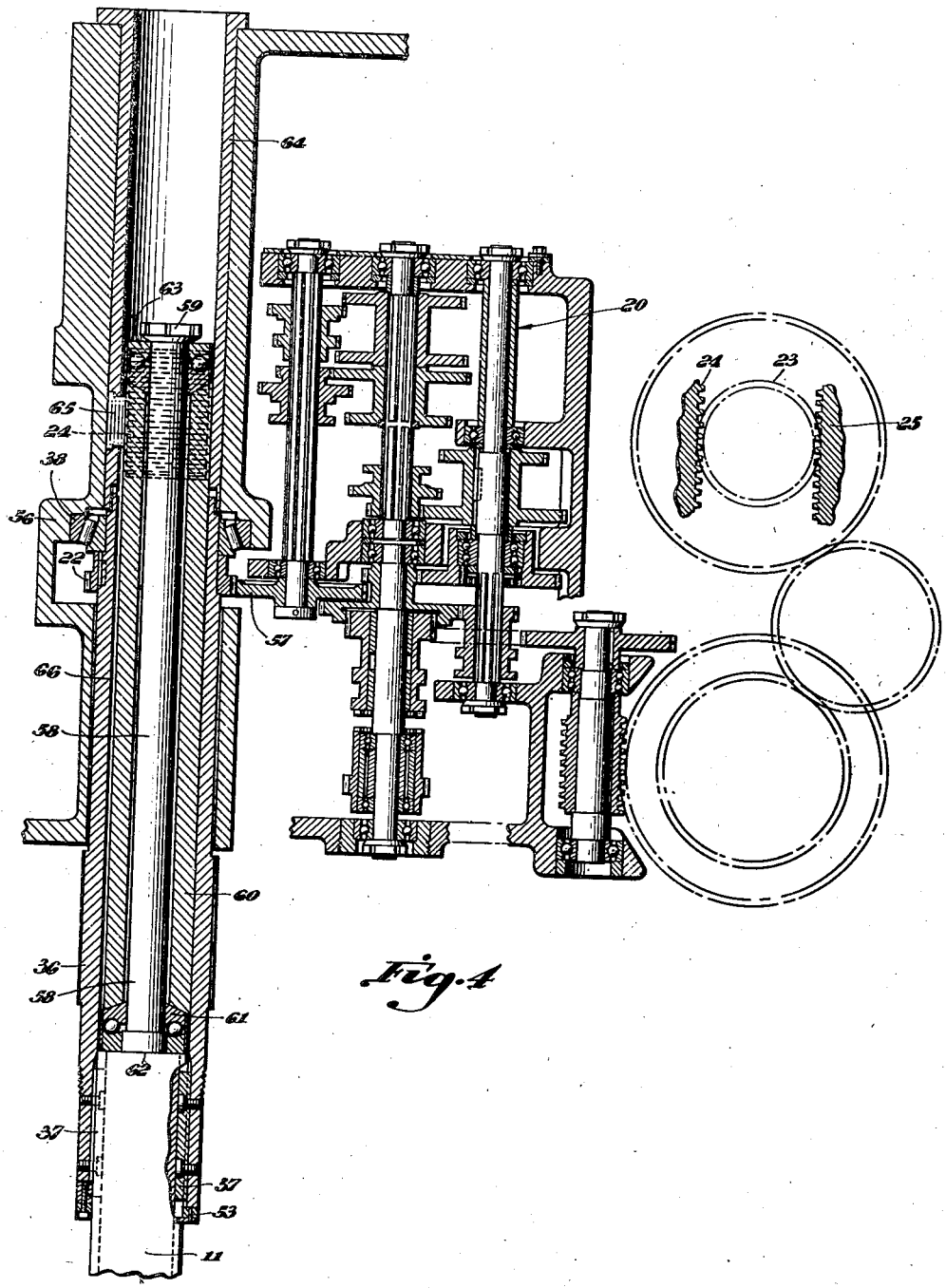
Figure 4 is a sectional layout view showing the gear arrangement in the transmission for feeding the spindle.

The feeding mechanism of the spindle is derived from spindle rotation through gear 22, feed transmission arranged within the box or bracket 21, and the spindle feed gear 23. Spindle sleeve 36 extends upwardly along the spindle 11 and is supported at its upper end, as previously indicated, in an upper bearing 38 which is housed within a lug 56 of the casing. The gear 22 is keyed to the spindle sleeve 36 at a point just below the bearing 38 and operates within a recess just below the casing lug. The feed transmission elements contained within the box or bracket 21 include a gear 57 which is in engagement with gear 38. Motion is conveyed, shiftably, through the transmission to the spindle feed gear 23 as shown in Figure 4.

Within the spindle sleeve 36, the spindle 11 contains a counterturned portion 58 which, at its upper end, is threaded to carry a nut 59. A rack sleeve 60 surrounds the counterturned portion 58 of the spindle, its lower end resting upon a thrust bearing 61 which abuts a shoulder 62 of the spindle, while the upper end is sustained in a thrust bearing 63 disposed beneath nut 59. The sleeve has rack teeth 24 cut in it as indicated by the dotted lines at the left-hand side of Figure 4 or as indicated diagrammatically at the right-hand side of the drawing.

The spindle passage at the upper portion of the head 5 is bored to receive a sleeve 64 which carries a key 65 for engagement with a keyway 66 extending longitudinally of the rack sleeve. The sleeve also is cut away to provide access for engagement of the feeding pinion 23 with the teeth on the rack sleeve disposed within the sleeve 64. From this construction it will be seen that the spindle 11 may rotate freely within the rack sleeve, its upper portion being supported on the bearing 38, while the rack sleeve in turn may move freely in an axial direction but its rotation is obstructed through engagement of the key 65 with the keyway 66. The thrust attending feeding motion is sustained by bearings 62 and 63, both in up and down direction.

Having described my invention, I claim:

1. A radial drill head having a spindle assembly mounted therein, a large gear, a bearing mounted independently of the spindle and spaced therefrom, the said bearing having one portion engaging the large gear adjacent the outer periphery of the large gear and having another portion supported from the head about the axis of rotation of the spindle, a pair of driving gears for said spindle rotatively mounted in the drill head, means for driving said gears, one of said gears in mesh with said large gear, and a gear element splined on said spindle assembly and shiftable for coupling either said large gear or the other of said driving gears to said spindle assembly.

2. A radial drill head having a power shaft and a spindle, a constantly driven gear, a bearing assembly mounted upon said head independently of the spindle and spaced from the spindle, said bearing assembly ahving an outer race engaging the constantly driven gear adjacent the outer periphery of the gear and having an inner race supported from the head upon the axis of rotation of the spindle, a speed change transmission for driving said constantly driven gear, coupling teeth on said constantly driven gear, a shiftable gear splined on said spindle, and means for shifting said gear either into mesh with said speed change transmission or with said coupling teeth.

3. A radial drill head having a spindle assembly mounted therein, a large gear, a bearing assembly mounted independently of the spindle and spaced therefrom, the said bearing assembly comprising an outer race engaging the large gear adjacent the outer periphery of the large gear, and having an inner race supported from the head upon the axis of rotation of the spindle, a pair of driving gears for said spindle rotatively mounted in the drill head, means for driving said gears, one of said gears in mesh with said large gear, and a gear element splined on said spindle assembly and shiftable for coupling either said large gear or the other of said driving gears to said spindle assembly.

4. In a radial drill head, a spindle, a transmission gear, means for furnishing power to said transmission gear, a bull gear surrounding said spindle meshed with said transmission gear, a bearing mounted independently of the spindle and spaced therefrom, said bearing having one portion thereof engaging the bull gear at a point adjacent the outer periphery of the bull gear and having another portion thereof supported from the head about the axis of rotation of the spindle, coupling teeth on said bull gear, a shiftable gear surrounding said spindle and slidably mounted thereon, and means including said shiftable gear for coupling said bull gear with said spindle through said coupling teeth.

5. In a machine tool having a casing, a spindle, a transmission having a high-speed transmission gear and a low-speed transmission gear, a bull gear in mesh with the low-speed transmission gear, a bearing supporting the bull gear at points adjacent the outer periphery of the full gear, said bearing being supported from said head independently of said spindle and spaced therefrom, coupling teeth on said bull gear and a shiftable gear splined on said spindle comprising a member for engaging the coupling teeth on said bull gear for driving said spindle and having another gear member movable into engagement with the high-speed gear of said transmission for driving said spindle independently of said bull gear.

WILLIAM G. HOELSCHER.